Aug. 25, 1959     H. S. STINSON     2,900,755
ATTACHMENT FOR FISHHOOKS
Filed May 13, 1957

INVENTOR
Harold S. Stinson

United States Patent Office 2,900,755
Patented Aug. 25, 1959

2,900,755

ATTACHMENT FOR FISHHOOKS

Harold S. Stinson, Town and Country, Mo.

Application May 13, 1957, Serial No. 658,760

5 Claims. (Cl. 43—44.6)

The invention has to do with the art of fishing and has reference more particularly to the class of fishing where live minnows are employed as bait. The invention represents an important advance in the fishing art. It not only provides a new method of attaching a live minnow to a fishhook, but through the employment of its features of construction, arrangement, and combination of parts permits a novel disposition of the fish hook in relation to the body of the minnow; and, because of this latter fact the fish find it more difficult to obtain a purchase.

The objects of the present form of the invention are closely related to those of a previous application and its novelty resides in the broad combination of a fishhook and an attachment thereto for securely holding a minnow to it. The present embodiment employs the broad principles of the pending application Serial No. 645,619, filed March 12, 1957, and differs in the manner of operating the minnow holding device. Its principal features are significant for their durability, low cost of manufacture, simplicity of construction, thorough reliability, efficiency in its purpose, and its capability of being readily and easily handled.

Figure 1:
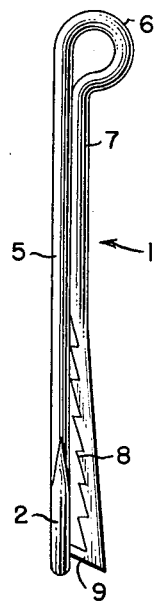
Figure 1 is a front elevation showing the mechanical features of the present form of the invention.

Referring to the drawings more particularly by reference numerals 1 indicates generally an attachment constructed in accordance with the teachings of the present invention shown in combination with a bend of the fishhook 2 and a fish line 3.

Figure 2:
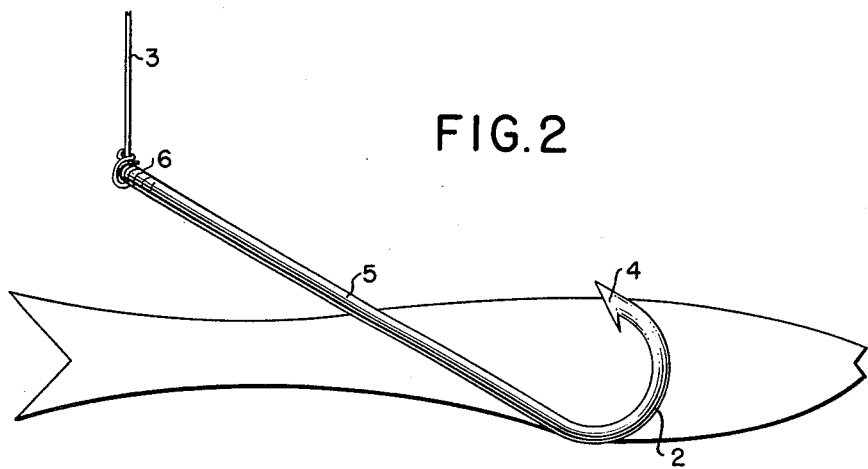
Figure 2 is a side elevational view of the device secured to the body of a minnow (shown in outline), the fishhook being disposed in relation to the body of the minnow in one of the preferred applications of the invention.

The present embodiment of the invention is made of a single piece of resilient wire-like material, one end of which is curved as shown in Figure 2 to form a bend of the fish-hook 2 having a burr 4. The shank 5 of the bend of the fish-hook 2 also serves the purpose of being one of the side members of the minnow holding clamp 1. The upper end of the shank 5 of the bend of the fish-hook 2 is formed into a circle 6, the present instance with but one loop of the wire-like material, which serves as a convenient place to attach a fishing line 3 while at the same time it adds some resiliency to the operation of the device. Extending from this circle 6 proceeds the shank 7 of the other side member of the minnow attaching clamp 1. Referring to the drawing it will be seen that the lower portion of the shank 7 is formed into the shape of saw-teeth 8, and, also that the end of the side member 7 is bent in an inwardly direction at an angle at the same time in an upwardly direction, which in effect forms an inclined face 9 of a wedge. It will hereinafter be evident that this inclined face 9 will facilitate the introduction of a minnow into the device. It will be evident from the drawings that this bent end of the side arm shank 7 having the inclined face 9 is longer than the teeth of the saw-toothed portion 8 and also that it is flattened so as to provide a resting place for the bend of the fish-hook 2 when it is in its normally closed position. This bent end of the side arm shank 7 also provides a stop to prevent the escape of a minnow when casting it into the waters. It will also be noted that the inclined faces of the saw-teeth 8 bear upwardly so that when a minnow is forced into the apparatus they will not do damage to the minnow.

From the above description it will be apparent that the minnow attaching element is composed of two side members 5 and 7. In the present instance the shank 5 of the bend of the fish-hook 2 forms one of the side members. These two side members are connected by a circular spring 6 which holds them in operative alignment and normally in a closed position as shown in Figure 2. The resiliency of the material used in making the device resists the separation of the side members 5 and 7. The use of the saw-teeth 8 as a means to provide a non-slip construction is purely diagrammatic, as any of the well-known non-slip constructions will do the job and I do not limit the invention to this construction.

In the present form of the invention I have found it convenient to position the bend of the fish-hook 2 at the end of the side arm 5, but I do not limit the invention to this embodiment as the bend of the fish-hook could be attached to either side arm 5 or 7 at any desirable point and could extend in any desired direction in relation to the side arms 5 and 7 without deviating from the scope of the claims. It will be noted from the drawings that the bend of the fish-hook 2 extends somewhat below the extremity of the side arm 7. The purpose of this arrangement will hereinafter become apparent in the explanation of the mode of operation. Those skilled in the art will conceive that the contour of the bend of the hook 2 may be varied which in effect will cause the bend of the hook to extend below the extremity of the side arm 7 in a greater or lesser degree. While I have consistently in this specification referred to one fishhook, it should be apparent to those skilled in the art that more than one hook could be employed if desired. I am advised that in some of our States more than one hook attached to a live minnow is outlawed, and it is with this in mind that I have devoted the present application to the illustration of one fishhook in order to make the device universally acceptable.

*Mode of operation*

In actual practice a live minnow is placed between the thumb and fingers of one hand, the belly of the minnow toward the palm of the hand, the fishhook with its minnow holding apparatus is held by the other hand and applied to the minnow by placing the inclined face 9 against the top edge of the minnow, and, by applying pressure the minnow itself will act as a wedge to pry open the side members 5 and 7 permitting the introduction or insertion of the minnow between the inner surfaces of the side members 5 and 7. The saw-toothed portion 8 of the side arm 7 will act as a deterrent to prevent the minnow from escaping and the bent end of the side arm 7 having the inclined face 9 will act as a stop to prevent the tension of the resilient wire-like construction of the side arms 5 and 7 from forcing the minnow out of its ends. Due to the direction of the saw-teeth 8 they will offer little resistance to the introduction of the minnow while at the same time effectually offer resistance to the movement of the minnow in the opposite or sideway directions.

Another method of operation is possible because of the novel construction of the device. In this embodiment of the invention only one of the ends of the side arms is bent at an angle having an inclined face 9. While it is apparent that the side arms 5 and 7 could easily be provided with bent ends having an inclined face 9 on each of them, I have not done so in this embodiment of the invention so as to permit another way of applying the invention to a minnow. The minnow is held in one hand the same as before but the method of applying the device differs. The side arm 7 is held by the other hand, the minnow top edge is placed against the protruding portion of the bend of the fish-hook 2, the bottom end of the side arm now is pulled away from the minnow and after the device is in position the side arm 7 is released and snaps around the body of the minnow holding it securely. The advantage of this latter method of application lies in the fact that only the smooth inner surface of the side arm 5 touches the minnow until it is in place.

It is to be understood that the foregoing description and the accompanying drawings is a simple diagrammatic illustration and example, and that changes and alterations in the present disclosure, which will be readily apparent to one skilled in the art, are contemplated as within the spirit of the present invention and the scope of the claims.

What I claim is:

1. A fish-hook made of a single piece of wire-like material bent between its extremities to form a line-attaching end loop at its upper end, the two extremities of said loop extending to form two shanks of substantially equal length, the bend and burr of a fish-hook formed at the extremity of one of the shanks, the extremity of the other shank bent toward the first said shank and upwardly toward the loop, the end of the bent member bearing against the said first leg in abutting engagement, thus providing a triangular shaped opening so that bait may be used as a wedge to pry apart the respective shanks.

2. A fish-hook made of a single piece of wire-like material bent between its extremities to form a line-attaching end loop at its upper end, the two extremities of said loop extending to form two shanks of substantially equal length, the bend and burr of a fish-hook formed at the extremity of one of the shanks, the said bend of the said fish-hook lying substantially at right angles to the plane of the said shanks, the extremity of the other shank bent toward the first said shank and upwardly toward the loop, the end of the bent member bearing against the said first leg in abutting engagement, thus providing a triangular shaped opening so that bait may be used as a wedge to pry apart the respective shanks.

3. A fish-hook made of a single piece of wire-like material bent between its extremities to form a line-attaching end loop at its upper end, the two extremities of said loop extending to form two shanks of substantially equal length, the bend and burr of a fish-hook formed at the extremity of one of the shanks, said bend of the said fish-hook extending beyond the extremity of the said other shank, the extremity of the other shank bent toward the said first shank and upwardly toward said loop, the end of the bent member bearing against the said first leg in abutting engagement, thus providing a triangular shaped opening so that a minnow may be used as a wedge to pry apart the respective shanks.

4. A fish-hook made of a single piece of wire-like material bent between its extremities to form a line-attaching end loop at its upper end, the two extremities of said loop extending to form two shanks of substantially equal length, the bend and burr of a fish-hook formed at the extremity of one of the shanks, said bend of said fish-hook extending beyond the extremity of the said other shank and lying substantially at right angles to the plane of the said shanks, a portion of the other shank formed to engage the body of a minnow, and the said extremity of said other shank bent toward said first shank and upwardly toward said loop, the end of the bent member bearing against said first leg in abutting engagement, thus providing a triangular shaped opening so that a minnow may be used as a wedge to pry apart the respective shanks.

5. A fish-hook made of a single piece of wire-like material bent between its extremities to form a line-attaching end loop at its upper end, the two extremities of the said loop extending to form two shanks of substantially equal length, a bend and burr of a fish-hook formed at the extremity of one of the shanks, the said bend of the said fish-hook extending beyond the extremity of the other shank and lying substantially at right angles to the plane of the said shanks, the extremity of the said other shank being bent toward the said first shank and upwardly toward the loop, the end of the bent member bearing against the said first leg in abutting engagement thus providing a triangular shaped opening so that a minnow may be used as a wedge to pry apart the respective shanks.

References Cited in the file of this patent

UNITED STATES PATENTS

| | | |
|---|---|---|
| 754,349 | Scott | Mar. 8, 1904 |
| 821,544 | Scott | May 22, 1906 |
| 1,961,378 | Mitchell | June 5, 1934 |
| 2,215,612 | Hathaway | Sept. 24, 1940 |

FOREIGN PATENTS

| | | |
|---|---|---|
| 33,887 | Norway | Jan. 16, 1922 |
| 490,356 | Canada | Feb. 10, 1953 |